US007966121B2

United States Patent
Aoyagi et al.

(10) Patent No.: US 7,966,121 B2
(45) Date of Patent: Jun. 21, 2011

(54) FUEL EFFICIENCY DISPLAY DEVICE FOR FUEL CELL VEHICLE, AND FUEL EFFICIENCY DISPLAYING METHOD FOR FUEL CELL VEHICLE

(75) Inventors: Satoshi Aoyagi, Shimotsuke (JP); Kenichiro Kimura, Utsunomiya (JP); Sachito Fujimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 680 days.

(21) Appl. No.: 11/699,303

(22) Filed: Jan. 29, 2007

(65) Prior Publication Data

US 2007/0176762 A1    Aug. 2, 2007

(30) Foreign Application Priority Data

Jan. 31, 2006   (JP) ................................ 2006-022060

(51) Int. Cl.
*G06F 19/00* (2006.01)
*B60T 7/12* (2006.01)
*B60K 28/12* (2006.01)

(52) U.S. Cl. ......... 701/123; 701/103; 180/284; 903/944

(58) Field of Classification Search .................. 701/123, 701/70, 22, 51, 36, 99, 1, 86, 103, 104, 112, 701/200, 201, 207–211; 180/65.1, 65.21, 180/65.22–65.31, 225, 284, 69.4, 69.5; 305/152; 713/300, 310, 320, 321, 322, 323, 324, 330, 713/340; 340/539.11, 539.13; 455/343.1–345, 455/574; 348/333.01, 333.13; 903/944

See application file for complete search history.

(56) References Cited

U.S. PATENT DOCUMENTS

| 5,230,256 | A | * | 7/1993 | Oizumi et al. | ................. 477/127 |
| 6,988,033 | B1 | * | 1/2006 | Lowrey et al. | ................. 701/123 |
| 2001/0018138 | A1 | * | 8/2001 | Iwase | .............................. 429/13 |
| 2003/0232680 | A1 | * | 12/2003 | Matsunaga et al. | ........... 475/131 |
| 2004/0008109 | A1 | * | 1/2004 | Endoh | ........................ 340/450.2 |

(Continued)

FOREIGN PATENT DOCUMENTS

JP          7099706      *  4/1995

(Continued)

OTHER PUBLICATIONS

Japanese Office Action for Application No. 2006-022060, dated Nov. 30, 2010.

*Primary Examiner* — Jack Keith
*Assistant Examiner* — Muhammad Shafi
(74) *Attorney, Agent, or Firm* — Nelson Mullins Riley & Scarborough LLP; Anthony A. Laurentano, Esq.; EuiHoon Lee, Esq.

(57) ABSTRACT

This fuel efficiency display device for a fuel cell vehicle includes: a first interval vehicle efficiency obtaining device which obtains a first interval vehicle efficiency being a fraction of a generated traveling energy with respect to a consumed fuel amount in a predetermined first time-interval; a second interval traveling energy obtaining device which obtains a second interval traveling energy being a traveling energy generated in a predetermined second time-interval which is shorter than the first time-interval; and a second interval fuel efficiency obtaining device which obtains a second interval fuel efficiency being a fuel efficiency in the second time-interval, based on at least the first interval vehicle efficiency and the second interval traveling energy.

4 Claims, 5 Drawing Sheets

U.S. PATENT DOCUMENTS

| | | | |
|---|---|---|---|
| 2004/0079564 A1* | 4/2004 | Tabata | 180/65.2 |
| 2006/0182157 A1* | 8/2006 | Bollenz et al. | 372/32 |

FOREIGN PATENT DOCUMENTS

| | | |
|---|---|---|
| JP | 9-98516 | 4/1997 |
| JP | 11-220808 | 8/1999 |
| JP | 2001-145211 | 5/2001 |
| JP | 2004-045180 | 2/2004 |
| JP | 2004-153958 | 5/2004 |
| JP | 2008-501573 | 1/2008 |
| KR | 10-2005-0093937 * | 9/2005 |
| WO | 2006/001809 A1 | 1/2006 |

* cited by examiner

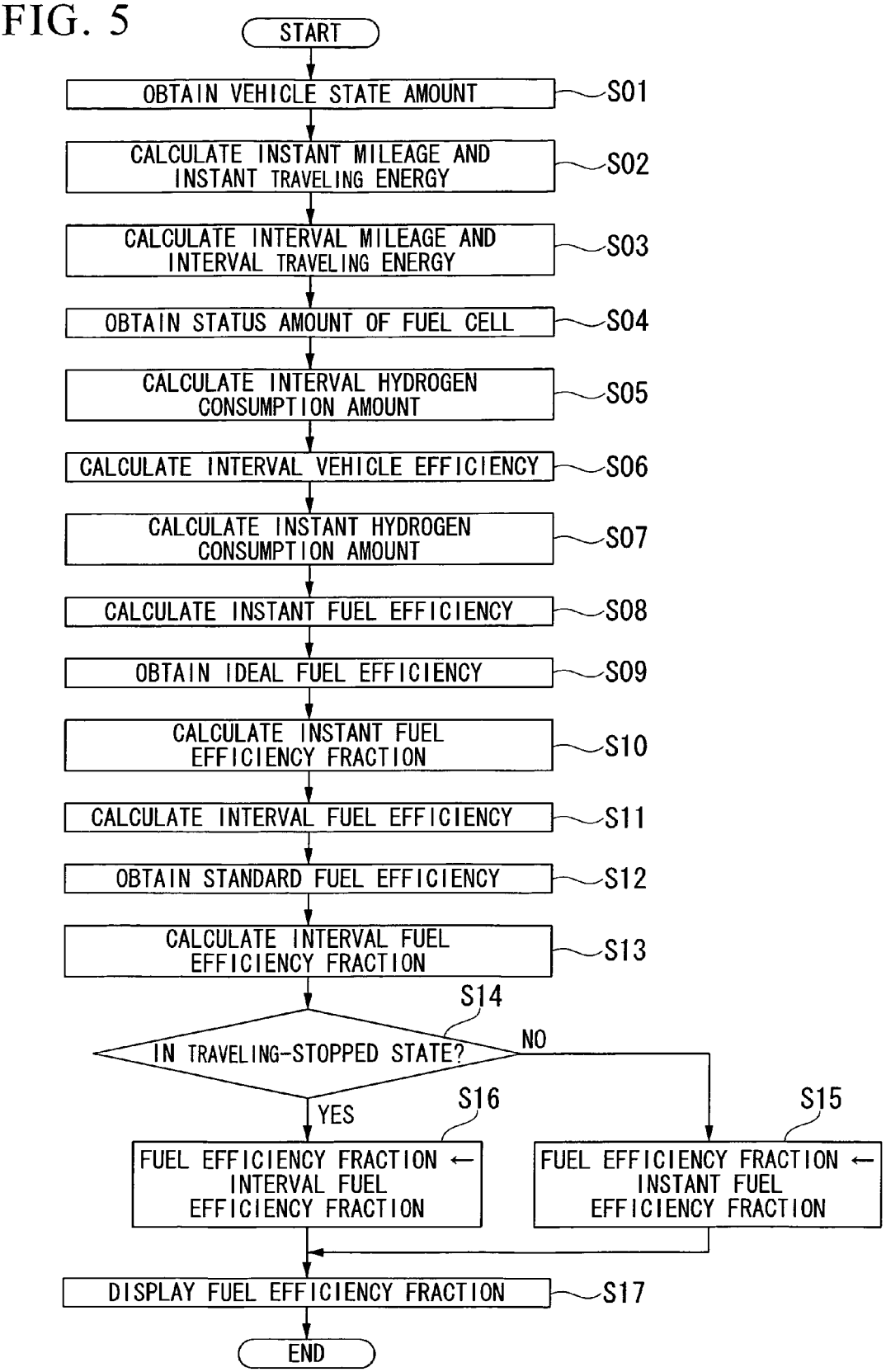

FUEL EFFICIENCY DISPLAY DEVICE FOR
FUEL CELL VEHICLE, AND FUEL
EFFICIENCY DISPLAYING METHOD FOR
FUEL CELL VEHICLE

BACKGROUND OF THE INVENTION

Priority is claimed on Japanese Patent Application No. 2006-022060, filed Jan. 31, 2006, the contents of which are incorporated herein by reference.

FIELD OF THE INVENTION

The present invention relates to a fuel efficiency display device for a fuel cell vehicle, and a fuel efficiency displaying method for a fuel cell vehicle.

DESCRIPTION OF THE RELATED ART

A conventional fuel gauge is known which informs information regarding fuel efficiency of a vehicle on traveling to an occupant, by displaying fuel consumption status which corresponds to mileage and fuel consumption amount in a state in which, for example, the vehicle speed of the vehicle exceeds the predetermined value (for example, refer to Japanese Unexamined Patent Application, First Publication No. 2004-45180).

By the way, in a fuel cell vehicle equipped with a motor as a driving source of the vehicle, and a fuel cell system including a power storage device and a fuel cell which receives reaction gasses and generates electrical power by electrochemical reactions, transmissions of electrical power are performed between the motor and the power storage device in accordance with the traveling state of the vehicle, the power-generating state of the fuel cell, the power-accumulating state of the power storage device, and the like. And meanwhile, the electrical power generated by the fuel cell is supplied to the motor or the power storage device.

Accordingly, if the fuel gauge for a vehicle according to the above-mentioned conventional technology is equipped in the fuel cell vehicle, only the mileage in a state in which the vehicle speed of the vehicle exceeds the predetermined threshold, and the fuel consumption state corresponding to the fuel consumption amount, will be displayed; therefore, there was a possibility in that it is difficult to appropriately inform the fuel efficiency of the fuel cell vehicle which performs charging and discharging of the power storage device.

The present invention was made in view of the above-mentioned circumstances, and has an object of providing a fuel efficiency display device for a fuel cell vehicle, and a fuel efficiency displaying method for a fuel cell vehicle, which can appropriately inform information regarding the fuel efficiency of a fuel cell vehicle to an occupant.

SUMMARY OF THE INVENTION

In order to achieve the above-mentioned object, the present invention employed the followings.

That is, the present invention employed a fuel efficiency display device for a fuel cell vehicle including a motor being a driving source of the fuel cell vehicle, a motor controller for controlling an operation status of the motor, and a fuel cell system being a power source for the motor. The fuel cell system includes a fuel cell which receives reaction gasses and performs electrochemical reactions to generate an electrical power, and a power storage device which is charged with the generated electrical power from the fuel cell and a regeneration power from the motor. The fuel efficiency display device for a fuel cell vehicle includes: a first interval vehicle efficiency obtaining device which obtains a first interval vehicle efficiency being a fraction of a generated traveling energy with respect to a consumed fuel amount in a predetermined first time-interval; a second interval traveling energy obtaining device which obtains a second interval traveling energy being a traveling energy generated in a predetermined second time-interval which is shorter than the first time-interval; and a second interval fuel efficiency obtaining device which obtains a second interval fuel efficiency being a fuel efficiency in the second time-interval, based on at least the first interval vehicle efficiency and the second interval traveling energy.

According to the fuel efficiency display device for a fuel cell vehicle, a first interval vehicle efficiency which is a fraction of a produced traveling energy with respect to a fuel amount consumed in the fuel cell (that is, a vehicle efficiency being a fraction of a traveling energy which actually contributed for the traveling of the vehicle, in the first time-interval which is a relatively long time interval, with respect to a generated electrical energy generated from fuels consumed for power generation in the fuel cell (i.e., an electrical energy and the like supplied from the fuel cell to the motor and the power storage device)), is obtained. With this, it is possible to display appropriate fuel efficiency based on the traveling energy which actually contributed to the traveling of the vehicle, regardless of, for example: the existence and the like of electrical power charging from the fuel cell and the motor to the power storage device in a relatively short time; the existence of power assistance by the power storage device to the output power of the fuel cell in a relatively short time; or the like.

The first interval vehicle efficiency obtaining device may calculate the consumed fuel amount based on a discharged fuel amount discharged from the fuel cell system to an outside thereof.

In this case, by comprehending the discharged fuel amount in the fuels consumed in the fuel cell system, which was discharged to the outside without contributing to the power generation in the fuel cell, it is possible to precisely calculate the fuel consumption amount which contributed to the generation of the various kinds of energies.

The fuel efficiency display device for a fuel cell vehicle may further include: an ideal fuel efficiency obtaining device which obtains an ideal fuel efficiency being a predetermined ideal fuel efficiency which corresponds to a state of the fuel cell vehicle in the second time-interval; a second interval fuel efficiency difference calculating device which calculates a second interval fuel efficiency difference being a status amount according to a difference between the second interval fuel efficiency obtained by the second interval fuel efficiency obtaining device and the ideal fuel efficiency obtained by the ideal fuel efficiency obtaining device; and a display device which displays the second interval fuel efficiency difference.

In this case, by displaying the difference between the second interval fuel efficiency and the ideal fuel efficiency (for example, the difference between the second interval fuel efficiency and the ideal fuel efficiency, the fraction of the second interval fuel efficiency with respect to the ideal fuel efficiency, or the like), that is, by displaying the deviation amount of the fuel efficiency accompanied by driving operations of a driver and the ideal fuel efficiency, it is possible to suggest to the driver to follow driving operations which enables obtaining the ideal fuel efficiency; therefore, the fuel efficiency of the fuel cell vehicle can be increased.

The fuel efficiency display device for a fuel cell vehicle may further include: a first interval fuel efficiency obtaining device which obtains a first interval fuel efficiency being a fuel efficiency in the first time-interval, based on at least the consumed fuel amount and a mileage in the first time-interval; a standard fuel efficiency obtaining device which obtains a standard fuel efficiency being a predetermined standard fuel efficiency in the first time-interval; and a first interval fuel efficiency difference calculating device which calculates a first interval fuel efficiency difference being a status amount according to a difference between the first interval fuel efficiency obtained by the first interval fuel efficiency obtaining device and the standard fuel efficiency obtained by the standard fuel efficiency obtaining device. Furthermore, the display device may display the first interval fuel efficiency difference while the fuel cell vehicle is in a traveling-stopped state.

In this case, while the fuel cell vehicle is in a traveling-stopped state, by displaying the difference between the standard fuel efficiency and the first interval fuel efficiency in the first time-interval which is a relatively long interval (for example, the difference between the first interval fuel efficiency and the ideal fuel efficiency, the fraction of the first interval fuel efficiency with respect to the standard fuel efficiency, or the like), that is, by displaying the deviation amount of the fuel efficiency accompanied by driving operations of a driver with respect to the ideal fuel efficiency, it is possible to make the driver properly recognize the quality of the driving operation history of the driver.

The display device may display an image having a size corresponding to the second interval fuel efficiency difference.

In this case, by visually displaying the difference between the second interval fuel efficiency and the ideal fuel efficiency while the fuel cell vehicle is in a traveling state using the size of the image, or by visually displaying the difference between the first interval fuel efficiency and the standard fuel efficiency while the fuel cell vehicle is in a traveling-stopped state using the size of the image, it is possible to make the driver easily recognize the deviation amount of the fuel efficiency derived from the driving operations of the driver, with respect to the ideal fuel efficiency and the standard fuel efficiency.

In addition, the present invention employed a fuel efficiency displaying method for a fuel cell vehicle equipped with a fuel cell system being a power source for a vehicle. The fuel cell system includes a power storage device, and a fuel cell system which receives reaction gasses and performs electrochemical reactions to generate an electrical power. The fuel efficiency displaying method for a fuel cell vehicle includes: a first interval vehicle efficiency obtaining step in which a first interval vehicle efficiency being a fraction of a generated traveling energy with respect to a consumed fuel amount in a predetermined first time-interval is obtained; and a fuel efficiency obtaining step in which a fuel efficiency is obtained based on the first interval vehicle efficiency.

According to the fuel efficiency displaying method for a fuel cell vehicle, a first interval vehicle efficiency which is a fraction of a generated traveling energy with respect to a fuel amount consumed in the fuel cell, that is, the vehicle efficiency being a fraction of a traveling energy which actually contributed for the traveling of the vehicle, in the first time-interval which is a relatively long time interval, with respect to a generated electrical energy generated from fuels consumed for power generation in the fuel cell (i.e., an electrical energy and the like supplied from the fuel cell to the motor and the power storage device)), is obtained. With this, it is possible to display appropriate fuel efficiency based on the traveling energy which actually contributed to the traveling of the vehicle, regardless of, for example: the existence of electrical power charging from the fuel cell and the motor to the power storage device in a relatively shorter time, or the existence of power assistance by the power storage device to the output power of the fuel cell, or the like, in a relatively short time.

The fuel cell vehicle may include a motor being a driving source of the fuel cell vehicle, a motor controller for controlling an operation status of the motor, and the fuel cell system being a power source for the motor. The fuel cell system may include the fuel cell, and the power storage device which is charged with a generated power from the fuel cell and a regeneration power from the motor. The fuel efficiency displaying method for a fuel cell vehicle may further include: a second interval traveling energy obtaining step in which a second interval traveling energy being a traveling energy generated in a predetermined second time-interval which is shorter than the first time-interval, is obtained; and a second interval fuel efficiency obtaining step in which a second interval fuel efficiency being a fuel efficiency in the second time-interval is obtained based on at least the first interval vehicle efficiency and the second interval traveling energy.

In this case, by obtaining the second interval fuel efficiency in the second time-interval being a relatively short time interval based on the first interval vehicle efficiency and the second interval traveling energy, it is possible to display instant fuel efficiency which corresponds to the various driving operations of the driver; therefore, it is possible to make the driver easily recognize the quality of each driving operations.

In the first interval vehicle efficiency obtaining step, the consumed fuel amount may be calculated based on a discharged fuel amount discharged from the fuel cell system to an outside thereof.

In this case, by comprehending the discharged fuel amount, in the fuels consumed in the fuel cell system, which was discharged to the outside without contributing to the power generation in the fuel cell, it is possible to precisely calculate the fuel consumption amount which contributed to the generation of the various kinds of energies.

The fuel efficiency displaying method for a fuel cell vehicle may further include: an ideal fuel efficiency obtaining step in which an ideal fuel efficiency being a predetermined ideal fuel efficiency which corresponds to a state of the fuel cell vehicle in the second time-interval, is obtained; a second interval fuel efficiency difference calculating step in which a second interval fuel efficiency difference being a status amount according to a difference between the second interval fuel efficiency obtained in the second interval fuel efficiency obtaining step and the ideal fuel efficiency obtained in the ideal fuel efficiency obtaining step, is calculated; and a displaying step in which the second interval fuel efficiency difference is displayed.

In this case, by displaying the difference between the second interval fuel efficiency and the ideal fuel efficiency (for example, the difference between the second interval fuel efficiency and the ideal fuel efficiency, the fraction of the second interval fuel efficiency with respect to the ideal fuel efficiency, or the like), that is, by displaying the deviation amount of the fuel efficiency accompanied by driving operations of a driver with respect to the ideal fuel efficiency, it is possible to suggest to the driver to follow driving operations which enables obtaining ideal fuel efficiency; therefore, the fuel efficiency of the fuel cell vehicle can be increased.

The fuel efficiency displaying method for a fuel cell vehicle may further include: a first interval fuel efficiency obtaining step in which a first interval fuel efficiency being a fuel efficiency in the first time-interval is obtained based on at least the consumed fuel amount and a mileage in the first time-interval; a standard fuel efficiency obtaining step in which a standard fuel efficiency being a predetermined standard fuel efficiency in the first time-interval is obtained; and a first interval fuel efficiency difference calculating step in which a first interval fuel efficiency difference being a status amount according to a difference between the first interval fuel efficiency obtained in the first interval fuel efficiency obtaining step and the standard fuel efficiency obtained in the standard fuel efficiency obtaining step, is calculated. Furthermore, in the displaying step, the first interval fuel efficiency difference may be displayed while the fuel cell vehicle is in a traveling-stopped state.

In this case, while the fuel cell vehicle is in a traveling-stopped state, by displaying the difference between the standard fuel efficiency and the first interval fuel efficiency in the first time-interval which is a relatively long interval (for example, the difference between the first interval fuel efficiency and the ideal fuel efficiency, or the fraction of the first interval fuel efficiency with respect to the standard fuel efficiency, or the like), that is, by displaying the deviation amount of the fuel efficiency accompanied by driving operations of a driver with respect to the ideal fuel efficiency, it is possible to make the driver properly recognize the quality of the driving operation history of the driver.

In said displaying step, an image having a size corresponding to the first interval fuel efficiency difference may be displayed.

In this case, by visually displaying the difference between the second interval fuel efficiency and the ideal fuel efficiency while the fuel cell vehicle is in a traveling state using the size of the image, or by visually displaying the difference between the first interval fuel efficiency and the standard fuel efficiency while the fuel cell vehicle is in a traveling-stopped state using the size of the image, it is possible to make the driver easily recognize the deviation amount of the fuel efficiency derived from the driving operations of the driver, with respect to the ideal fuel efficiency and the standard fuel efficiency.

BRIEF DESCRIPTION OF THE DRAWINGS

FIG. 3A shows the screen while the fuel cell vehicle is in a cruising state, FIG. 3B shows the screen while the fuel cell vehicle is in an accelerating state, and FIG. 3C shows the screen while the fuel cell vehicle is in a stopped state.

FIG. 5 is a flowchart showing operations of the fuel efficiency display device shown in FIG. 1.

DETAILED DESCRIPTION OF THE INVENTION

A fuel efficiency display device for a fuel cell vehicle, and a fuel efficiency displaying method for a fuel cell vehicle, according to one embodiment of the present invention will be explained below with reference to the drawings.

Figure 1:
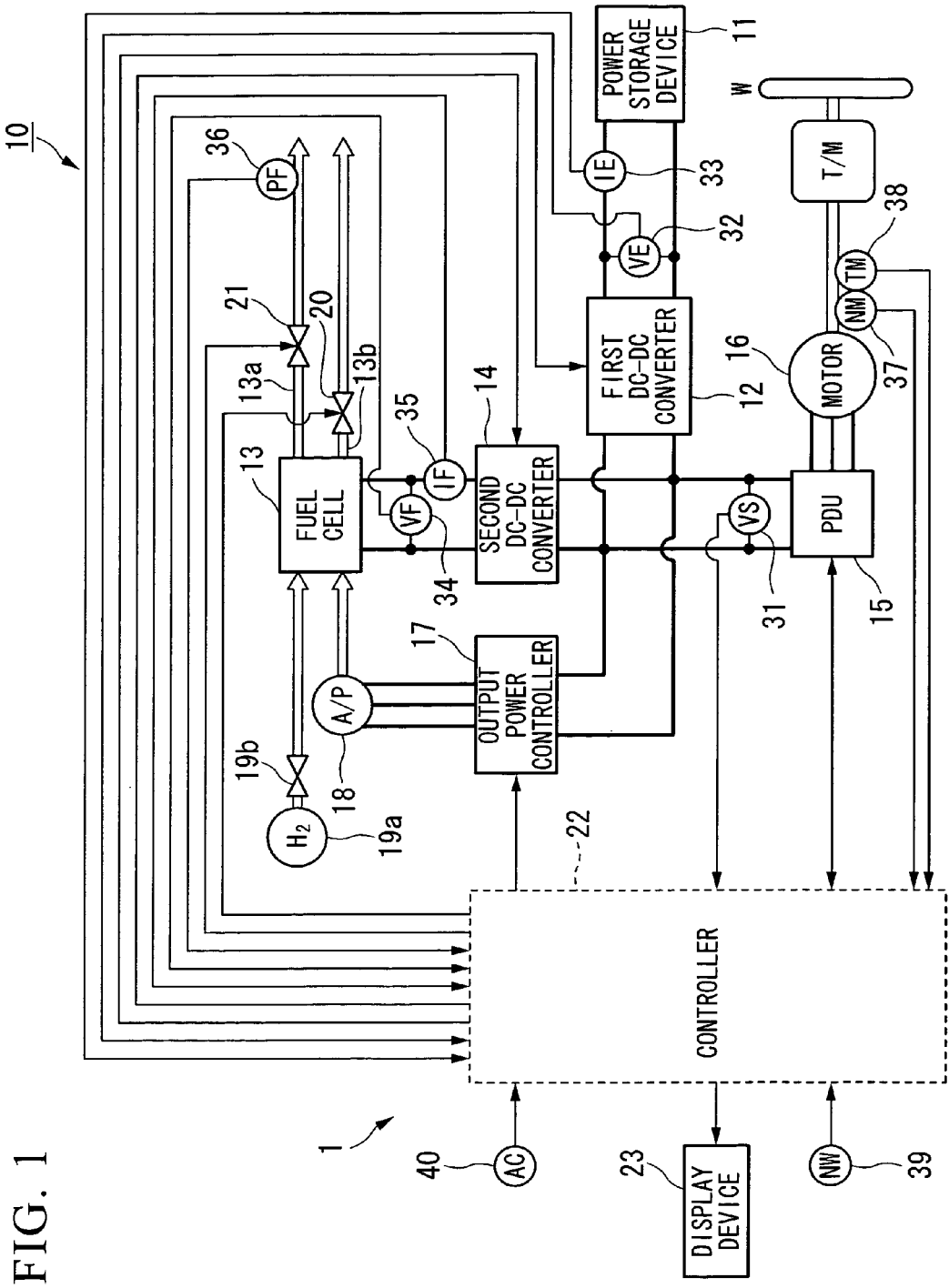
FIG. 1 shows a construction of a fuel cell vehicle according to one embodiment of the present invention.

As shown in FIG. 1, a fuel cell vehicle 10 including a fuel efficiency display device 1 of the present invention is provided with a power storage device 11, a first DC-DC converter 12, a fuel cell 13, a second DC-DC converter 14, a PDU (a Power Drive Unit) 15, a motor 16, an output power controller 17, an air-supply device (A/P) 18, a hydrogen tank 19a and a hydrogen supply valve 19b, a backpressure valve 20, a purging valve 21, a controller 22, a display device 23, a system voltage sensor 31, a first voltage sensor 32, a first current sensor 33, a second voltage sensor 34, a second current sensor 35, a purging flow rate sensor 36, a motor rotation number sensor 37, a motor torque sensor 38, a wheel speed sensor 39, and an accelerator-opening degree sensor 40.

The power storage device 11 is a capacitor or battery or the like formed from, for example, an electric double layer condenser, an electrolytic condenser, or the like. The power storage device 11 is connected with the second DC-DC converter 14 and the PDU 15 in a parallel manner, via the interactive first DC-DC converter 12.

The first DC-DC converter 12 is formed so as include, for example, an interactive chopper-type power conversion circuit which can increase the terminal voltage VE and can decrease the system voltage VS of the of the power storage device 11. The first DC-DC converter 12 controls the output current IE output from the power storage device 11, by chopping operations for intermitting the voltage applied to the load and the current supplied to the load, that is, by ON and OFF operations (switching operations) of a switching element provided in the chopper-type power conversion circuit. The switching operations are controlled in accordance with a duty of a control pulse input from the controller 22 (i.e., the ratio of ON and OFF operations).

That is, the first DC-DC converter 12 can charge the power storage device 11 by decreasing the system voltage VS which relates to the generation of the fuel cell 13 or the regenerating operations of the motor 16. In addition, the first DC-DC converter 12 can increase the terminal voltage VE of the power storage device 11 and apply it to the PDU 15.

Furthermore, the first DC-DC converter 12 prohibits outputting the output current IE from the power storage device 11 in accordance with operating status of the fuel cell vehicle 10. In this case, when, for example, the duty of the control pulse input from the controller 22 to the first DC-DC converter 12 is set to 0%, then the switching element provided in the first DC-DC converter 12 is fixed to OFF-state, and the power storage device 12 and the PDU 15 are thereby electrically disconnected. Furthermore, in this case, when, for example, the duty of the control pulse is set to the predetermined value within a range between 0% and 100%, ON and OFF operations of the switching element provided in the first DC-DC converter 12 are controlled such that the output current of the first DC-DC converter 12 becomes zero.

Thus, each measurement signals from the first voltage sensor 32 which measures the terminal voltage VE of the power storage device 11, and the first current sensor 33 which measures the charging current and discharging current of the power storage device 11, is input to the controller 22.

The fuel cell 13 includes a plurality of layers of fuel cells, each fuel cell being an electrolytic electrode structure formed from a solid high-polymer electrolytic membrane formed from a cation-exchanging membrane and the like, sandwiched between a fuel electrode (an anode) formed from an anode catalyst and a gas-diffusion layer and an oxygen electrode (a cathode) formed from a cathode catalyst and a gas-diffusion layer, wherein the electrolytic electrode structure is further sandwiched between a pair separators. And these stacked fuel cells are sandwiched between a pair of end plates from both sides in the stacking direction thereof.

Air being an oxidant gas (reaction gas) including oxygen is supplied from the air-supply device 18 having an air compressor and the like to the cathode of the fuel cell 13, while fuel gas (reaction gas) including hydrogen is supplied from, for example, the highly pressurized hydrogen tank 19a via the hydrogen-supply valve 19b to the anode of the fuel cell 13.

Then, hydrogen ionized by catalytic reactions on the anode catalyst of the anode migrates to the cathode via the suitably humidified solid high-polymer electrolytic membrane. In addition, electrons generated accompanied by this migration are extracted to an external circuit and used as direct current electrical energy. At the cathode at this time, hydrogen ions, electrons, and oxygen react and produce water.

Moreover, the hydrogen-supply valve 19b is for example a pneumatic type of proportional pressure control valve which takes the pressure of air supplied from the air-supply device 18 as a signal pressure, and controls the pressure at the point of exit from the hydrogen-supply valve 19b of the hydrogen gas passing through the hydrogen-supply valve 19b so as to be within a predetermined range that corresponds to the signal pressure.

In addition, the air-supply device 18 having an air compressor and the like takes air from, for example, the outside of the fuel cell vehicle, compresses, and supplies the air as reaction gas to the cathode of the fuel cell 13. In addition, the rotation number of the motor (not illustrated) which drives the air-supply device 18 is controlled by the output power controller 17 having, for example, a PWM inverter that operates in a pulse width modulation mode (PWM), based on control instruction sent from the controller 22.

Then, the unreacted discharge gas discharged from the hydrogen discharging outlet 13a of the fuel cell 13 is introduced into a dilution box (not illustrated) via a discharging control valve (not illustrated) which is controlled so as to be opened and closed by the controller 22, and is discharged to the outside (atmosphere or the like) via the purging valve 21 after the hydrogen concentration thereof is reduced in the dilution box to a predetermined concentration.

Moreover, a part of the unreacted discharge gas discharged from the hydrogen discharging outlet 13a of the fuel cell 13 is introduced into a circulation path (not illustrated) having, for example, a circulation pump (not illustrated), an ejector (not illustrated), and the like. Hydrogen supplied from the hydrogen tank 19a and the discharged gas discharged from the fuel cell 13 are mixed, and are again supplied to the fuel cell 13.

Then, the unreacted discharge gas discharged from an air-discharging outlet 13b of the fuel cell 13 is discharged to the outside (atmosphere or the like) via the backpressure valve 20 of which a valve opening degree is controlled by the controller 22.

The second DC-DC converter 14 is formed so as to include, for example, an interactive chopper-type power conversion circuit which can increase and decrease the output voltage VF of the fuel cell 13. The second DC-DC converter 14 controls the output current IF output from the fuel cell 13, by chopping operations for intermitting the voltage applied to the load and the current supplied to the load, that is, by ON and OFF operations (switching operations) of a switching element provided in the chopper-type power conversion circuit. The switching operations are controlled in accordance with a duty of a control pulse input from the controller 22 (i.e., the ratio of ON and OFF operations).

For example, the second DC-DC converter 14 increases the output voltage VF of the fuel cell 13 in accordance with the driving status of the fuel cell vehicle 10. In this case, the duty of the control pulse is set to the predetermined value within a range between 0% and 100%, the output current IF of the fuel cell 13 being a primary current is limited in accordance with the duty of the control pulse, and the limited current is output as a secondary current.

Furthermore, the second DC-DC converter 14 sets a direct connection between the fuel cell 13 and the PDU 15, in accordance with the driving state of the fuel cell vehicle 10. In this case, if the duty of the control pulse is set to 100% and if the switching element is fixed to ON-state, then the output voltage VF of the fuel cell 13 and the system voltage VS which is an input voltage of the PDU 15 become the equivalent values with each other.

Each measurement signals output from the second voltage sensor 34 which measures the output voltage VF of the fuel cell 13 and the second current sensor 35 which measures the output current IF of the fuel cell 13, are input to the controller 22.

The fuel cell 13 and the power storage device 11 forming the fuel cell system work as batteries for the motor 16.

The PDU 15 is provided with, for example, a PWM inverter that operates in a pulse width modulation mode (PWM), and controls the driving and the regenerating operation of the motor 16 based on control instruction sent from the controller 22. This PWM inverter is provided with a bridge circuit which is formed by connecting a plurality of, for example, transistor switching elements so as to form a bridge. While, for example, driving the motor 16, the PWM inverter transforms the direct current powers output from the first DC-DC converter 12 and the second DC-DC converter 14 to three-phase alternating current power based on the pulse width modulation signal input from the controller 22, and then supplies it to the motor 16. On the other hand, while the motor 16 is in a regenerating operation, the three-phase alternating current power output from the motor 16 is converted to the direct current power, and the direct current power is supplied to the power storage device 11 via the first DC-DC converter 12 to charge the power storage device 11.

Moreover, the motor 16 is formed, for example, by a permanent magnet type three-phase alternating current synchronous motor that uses permanent magnets for the magnetic field, and is controlled so as to be driven by three-phase alternating current power supplied from the PDU 15. While the fuel cell vehicle is in deceleration, if driving power is transmitted from the driving wheels WF to the motor 16, the motor 16 also works as a generator, and produces so-called regenerative braking force to recover the kinetic energy of the fuel cell vehicle 10 as electric energy.

The controller 22 controls the power-generating state of the fuel cell 13 by outputting instructions for the pressure and the flow rate of the reaction gas supplied from the air-supply device 18 to the fuel cell 13, and an instruction for valve opening degree of the backpressure valve 20 based on, for example, the driving state of the fuel cell vehicle, the concentration of the hydrogen contained in the reaction gas supplied to the anode of the fuel cell 13, the concentration of the hydrogen contained in the discharged gas discharged from the anode of the fuel cell 13, and the power generating state of the fuel cell 13 (for example, the voltage between terminals of the plurality of fuel cells, the output voltage VF of the fuel cell 13, the output current IF output from the fuel cell 13, and the internal temperature of the fuel cell 13).

Furthermore, the controller 22 controls electrical power converting operation of the PWM inverter provided in the PDU 15. While driving the motor 16 for example, the controller 22 calculates a torque instruction which is an instruction value for the torque output from the motor 16, based on the measurement signal output from the accelerator-opening degree sensor 37 which measures an accelerator opening degree AC that corresponds to the accelerator-driving operation amount by the driver, and the measurement signal output from the motor rotation number sensor 36, with reference to, for example, a torque instruction map or the like which was set in advance so as to indicate the predetermined relationship of the accelerator opening degree AC, the rotation number NM, and the torque instruction. Then, the controller 22 calculates the target motor output power which is necessary for making the motor 16 output the torque in accordance with the torque instruction. Then, in accordance with the target motor output power, the controller 22 sets the switching instruction (i.e., the pulse width modulation signal) formed from pulses for driving ON and OFF of the switching element of the PWM inverter, by the pulse width modulation (PWM).

When the switching instruction is input from the controller 22 to the PDU 15, the current sequentially flows through the stator loop windings (not illustrated) of each phases of the motor 16. With this, the magnitude of the applied voltage (i.e., amplitude) and phases in U-phase, V-phase, and W-phase are controlled. Then, phase currents for U-phase, V-phase, and W-phase, which correspond to the torque instruction will be supplied to each phases of the motor 16.

Therefore, the measurement signal output from the system voltage sensor 31 which measures the system voltage VS being an input voltage for, for example, the PDU 15; the measurement signal output from the motor rotation number sensor 37 which measures the rotation number NM of the motor 16 (i.e., motor rotational number); the measurement signal output from the motor rotation number sensor 38 which measures the torque TM of the motor 16 (i.e., motor torque); and the measurement signal output from the accelerator-opening degree sensor 40 which measures the accelerator opening degree AC that corresponds to the accelerator operation amount by the driver, are input to the controller 22.

In addition, the controller 22 calculates the remaining capacity SOC of the power storage device 11 by, for example, calculating an integrating charging amount and an integrating discharging amount by integrating the charging current and the discharging current of the power storage device 11 for each predetermined time interval, and by adding these integrating charging amount and integrating discharging amount to a remaining amount at the initial state or the before of starting charging and discharging, or subtracting these integrating charging amount and integrating discharging amount from the remaining amount at the initial state or the before of starting charging and discharging.

Then, the controller 22 outputs a control pulse for controlling the power-transforming operations of the second DC-DC converter 14 in accordance with the target motor output power and the remaining capacity SOC of the power storage device 11, controls the value of the output current IF output from the fuel cell 13, outputs the control pulse for controlling the power transforming operations of the first DC-DC converter 12, and thereby controls charging and discharging of the power storage device 11.

Accordingly, each measurement signals output from the first voltage sensor 32 which measures the terminal voltage VE of the power storage device 11 and the first current sensor 33 which measures the charging current and the discharging current of the power storage device 11, is input to the controller 22.

Figure 2:
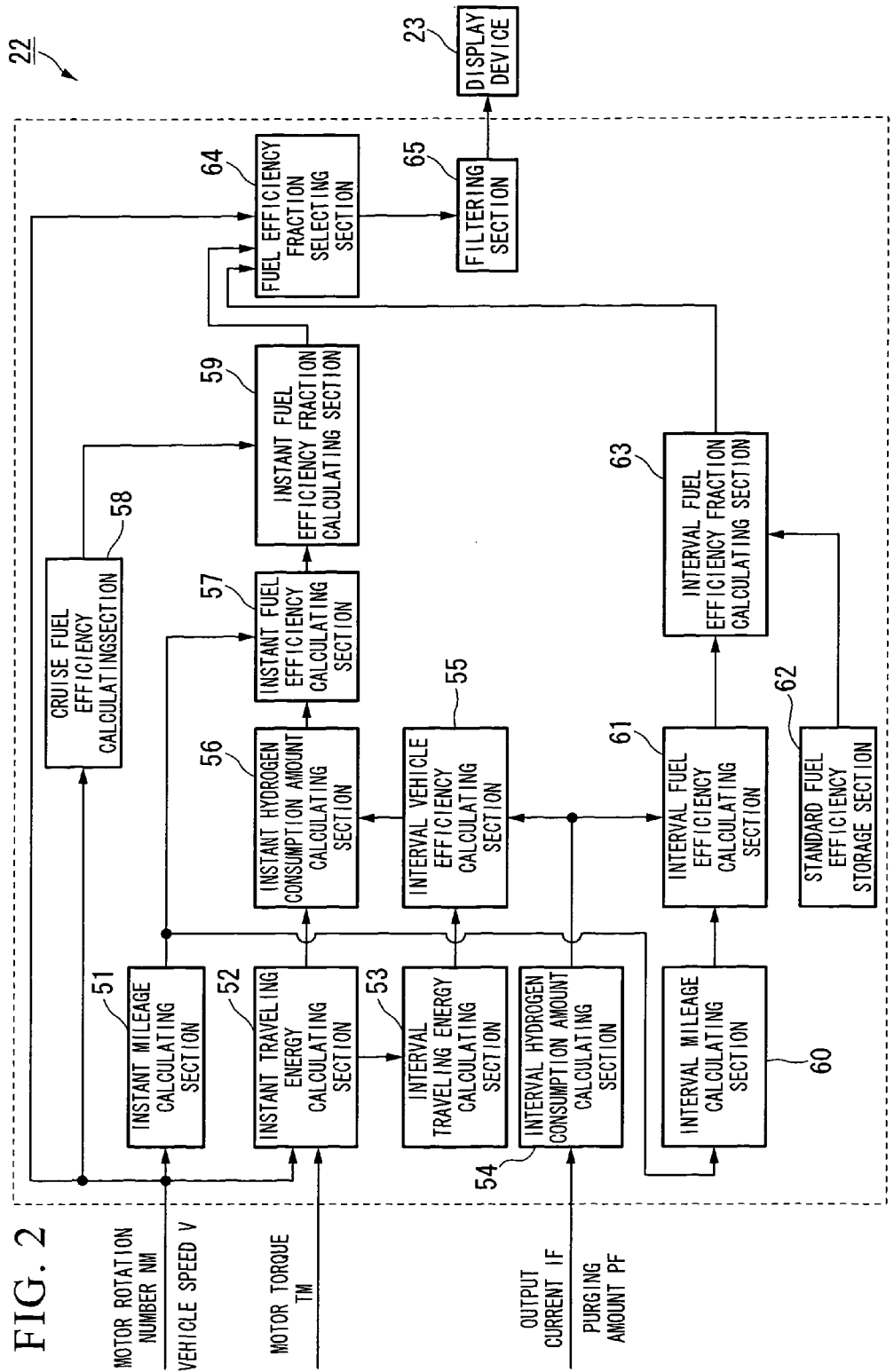
FIG. 2 shows a construction of a controller shown in FIG. 1.

As shown in FIG. 2 for example, the controller 22 is provided with an instant mileage calculating section 51, an instant traveling energy calculating section 52, an interval mileage calculating section 53, an interval hydrogen consumption amount calculating section 54, an interval vehicle efficiency calculating section 55, an instant hydrogen consumption amount calculating section 56, an instant fuel efficiency calculating section 57, a cruise fuel efficiency calculating section 58, an instant fuel efficiency fraction calculating section 59, an interval mileage calculating section 60, an interval fuel efficiency calculating section 61, a standard fuel efficiency storage section 62, an interval fuel efficiency fraction calculating section 63, a fuel efficiency fraction selecting section 64, and a filtering section 65. The controller 22 controls the display device 23 so as to display the fuel efficiency of the fuel cell vehicle 10.

The instant mileage calculating section 51 calculates an instant mileage being a mileage of the fuel cell vehicle 10 at the second time-interval that is a relatively short time interval and is also an instant time interval with respect to the present time, based on the measurement signal of the motor rotation number NM output from the motor rotation number sensor 37 for example, the measurement signal of the vehicle speed V of the fuel cell vehicle 10 that is calculated based on the measurement signal of a wheel speed NW output from the wheel speed sensor 39 for example, and the like.

The instant traveling energy calculating section 52 calculates an instant traveling-energy being a traveling energy of the fuel cell vehicle 10 produced at the second time-interval, based on: measurement signal of the motor rotation number NM output from the motor rotation number sensor 37 for example; the vehicle speed V of the fuel cell vehicle 10 calculated based on measurement signals and the like of the wheel speed NW output from the wheel speed sensor 39 for example; and measurement signal of the motor torque TM output from the motor torque sensor 38 for example.

The interval mileage calculating section 53 calculates an interval traveling energy being a traveling energy of the fuel cell vehicle 10 produced in a predetermined first time-interval that ascends, for example, from the present time to the past and is relatively long time interval, by integrating the history of the instant traveling-energy calculated by the instant traveling energy calculating section 52 through the first time interval.

The interval hydrogen consumption amount calculating section 54 calculates an interval hydrogen-consumption amount that is a hydrogen consumption amount consumed for the power generation in the fuel cell 13, through the predetermined first time-interval based on: measurement signal of output current IF of the fuel cell 13, that is output from the second current sensor 35 for example; and purging amount output from the purging amount sensor 36 for example (i.e., measurement signal of discharged unreacted hydrogen that is discharged to the outside of the fuel cell vehicle 1).

The interval vehicle efficiency calculating section 55 calculates interval vehicle efficiency that is an average energy at the predetermined first time-interval based on the interval traveling energy calculated by the interval mileage calculating section 53 and the interval hydrogen-consumption amount calculated by the interval hydrogen consumption amount calculating section 54. That is, the interval vehicle efficiency is calculated by, for example, dividing the interval traveling energy by the interval hydrogen-consumption amount.

The instant hydrogen consumption amount calculating section 56 calculates instant hydrogen-consumption amount that is an average hydrogen consumption amount that is consumed at the predetermined second time-interval for producing the traveling energy of the fuel cell vehicle 10, based on the interval vehicle efficiency calculated by the interval vehicle efficiency calculating section 55, and the instant traveling-energy calculated by the instant traveling energy calculating section 52. That is, the instant hydrogen-consumption amount is calculated by, for example, dividing the instant traveling-energy by the interval vehicle efficiency.

The instant fuel efficiency calculating section 57 calculates the instant fuel efficiency that is an average fuel efficiency of the fuel cell vehicle 10 at the predetermined second time-interval, based on the instant hydrogen-consumption amount calculated by the instant hydrogen consumption amount calculating section 56 and the instant mileage calculated by the instant mileage calculating section 51. That is, the instant fuel efficiency is calculated by, for example, dividing the instant mileage by the instant hydrogen-consumption amount.

The cruise fuel efficiency calculating section 58 calculates ideal fuel efficiency that is ideal fuel efficiency at the predetermined second time-interval, based on the measurement signal of the motor rotation number NM output from the motor rotation number sensor 37 for example, measurement signal of the wheel speed NW output from the wheel speed sensor 39 for example, and the like.

This ideal fuel efficiency is calculated assuming that, for example, the fuel cell vehicle 10 is in a cruise traveling mode in which the vehicle speed V maintains the suitable vehicle speed. Furthermore, the ideal fuel efficiency is set so as to be in a predetermined calculation range that corresponds to, for example, status of the traffic road (for example, the inclination, the road surface condition, and the like), a status outside the fuel cell vehicle 10 (for example, the weather condition such as wind velocity), the power-generating condition of the fuel cell 13, and the like.

The instant fuel efficiency fraction calculating section 59 calculates instant fuel efficiency fraction that is a fraction at the predetermined second time-interval of the instant fuel efficiency corresponding to driving operations of a driver with respect to the ideal fuel efficiency, based on the instant fuel efficiency calculated by the instant fuel efficiency calculating section 57 and the ideal fuel efficiency calculated by the cruise fuel efficiency calculating section 58. That is, the instant fuel efficiency fraction is calculated by, for example, dividing the instant fuel efficiency by the ideal fuel efficiency.

The interval mileage calculating section 60 calculates interval mileage that is mileage at the first time-interval by, for example, integrating the history of the instant mileage calculated by the instant mileage calculating section 51 through the predetermined first time-interval for example.

The interval fuel efficiency calculating section 61 calculates interval fuel efficiency that is an average fuel efficiency of the fuel cell vehicle 10 at the predetermined first time-interval, based on the interval hydrogen-consumption amount calculated by the interval hydrogen consumption amount calculating section 54 and the interval mileage calculated by the interval mileage calculating section 60. That is, the interval fuel efficiency is calculated by, for example, dividing the interval mileage by the interval hydrogen-consumption amount.

The standard fuel efficiency storage section 62 stores, in advance, information of the standard fuel efficiency that is a standard fuel efficiency based on a plurality of the actual traveling statuses of the fuel cell vehicle 10 so as to correspond to each of the predetermined interval regions through which the fuel cell vehicle 10 travels in, for example, a predetermined first time-interval. The standard fuel efficiency storage section 62 searches information of the standard fuel efficiency that corresponds to the positional information output from a navigation device (not illustrated) installed in the fuel cell vehicle 10.

The interval fuel efficiency fraction calculating section 63 calculates an interval fuel efficiency fraction that is a fraction of the interval fuel efficiency corresponding to driving operations of the driver, with respect to the standard fuel efficiency at the predetermined first time-interval, based on the interval fuel efficiency calculated by the interval fuel efficiency calculating section 61, and the standard fuel efficiency output from the standard fuel efficiency storage section 62. That is, the interval fuel efficiency fraction is calculated by, for example, dividing the interval fuel efficiency by the standard fuel efficiency.

The fuel efficiency fraction selecting section 64 determines whether the fuel cell vehicle 10 is in a traveling state or not, or the fuel cell vehicle 10 is in a traveling-stopped state or not, based on measurement signal of the motor rotation number NM output from the motor rotation number sensor 37 for example, measurement signal of the wheel speed NW output from the wheel speed sensor 39 for example, and the like. If it is determined that the fuel cell vehicle 10 is in the traveling state, then the instant fuel efficiency fraction is selected and is output as fuel efficiency fraction. If it is determined that the fuel cell vehicle 10 is in the traveling-stopped state, then the interval fuel efficiency fraction calculated by the interval fuel efficiency fraction calculating section 63 is selected and is output as fuel efficiency fraction.

The filtering section 65 performs a primary-delay filtering process to the fuel efficiency fraction output from the fuel efficiency fraction selecting section 64, in order to suppress sudden fluctuations.

The display device 23 is provided with, for example, a screen for displaying the fuel efficiency for example at top portion of an instrument panel arranged so as to be within a view range of a driver in driving operations. The display device 23 displays on the screen with the predetermined image of which shape, color, or the like changes depending on the size of the fuel efficiency fraction input from the fuel efficiency fraction selecting section 64 via the filtering section 65 of the controller 22.

Figure 3A:
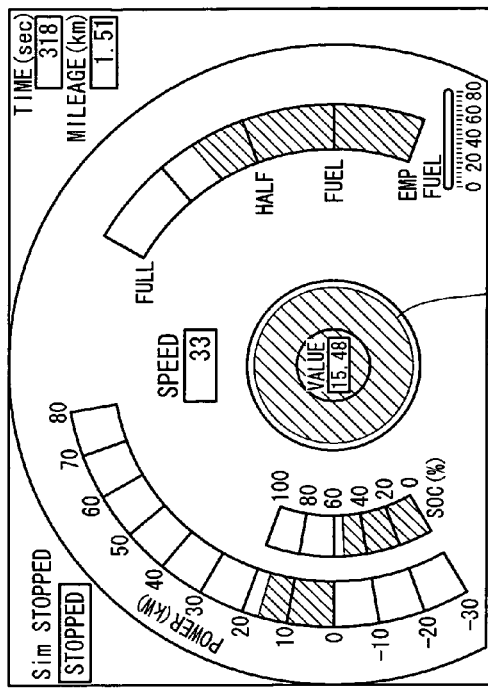
FIGS. 3A to 3C show one example of a screen of a display device.
Figure 4:
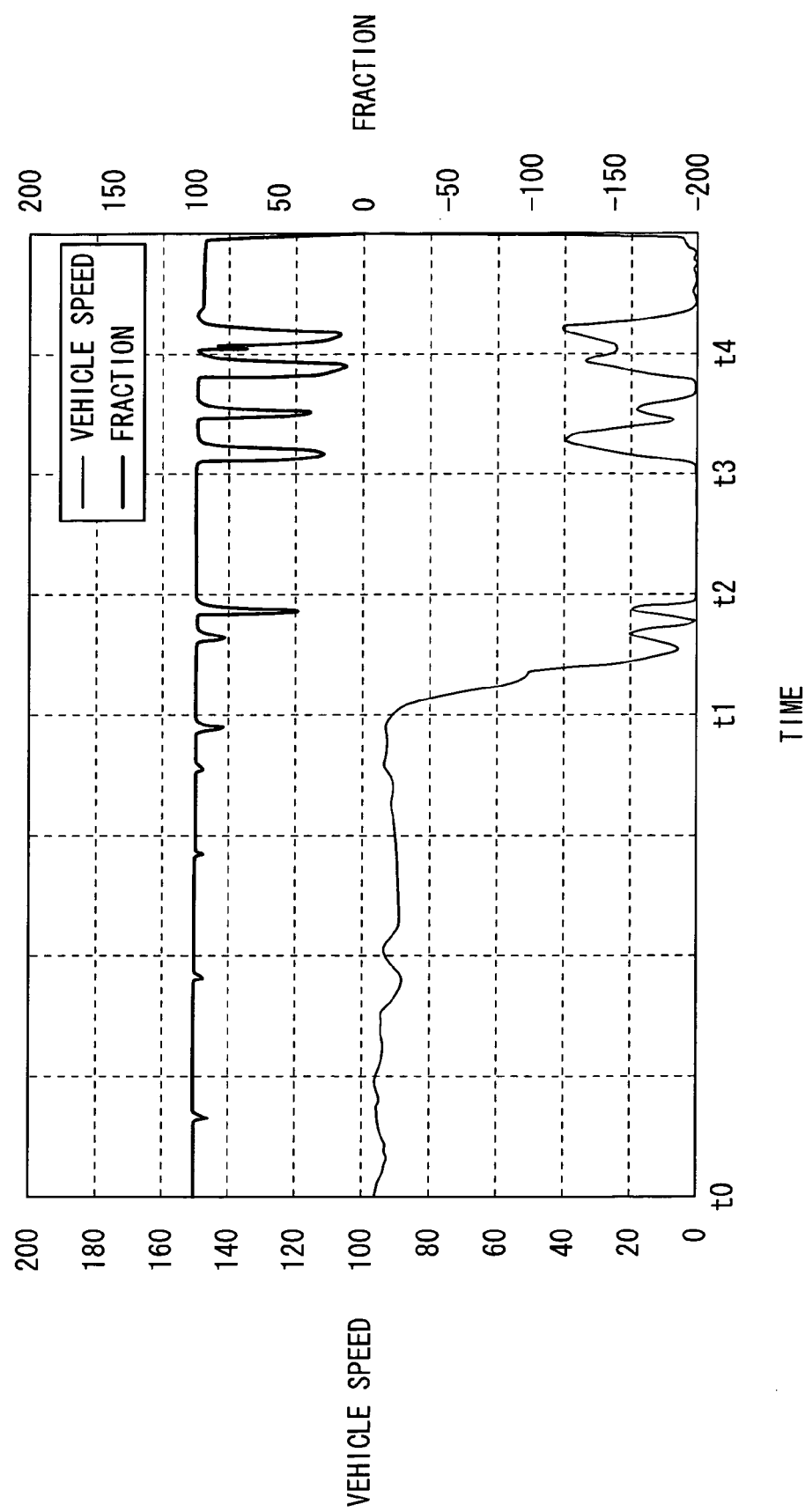
FIG. 4 is a graph showing one example of time-histories of vehicle speed and fuel efficiency fraction of the fuel cell vehicle.

For example, as shown in FIG. 3A, and from time t0 to t1 of FIG. 4, while the fuel cell vehicle 10 is in a cruising state of which the vehicle speed V maintains the predetermined vehicle speed, the instant fuel efficiency calculated by the instant fuel efficiency calculating section 57 is substantially equal to the ideal fuel efficiency calculated by the cruise fuel efficiency calculating section 58, and the instant fuel efficiency fraction thereby becomes substantially 100%. At this time, the display device 23 displays, for example, a sphere-shaped image Pa having, for example, the predetermined minimum radius and the predetermined color (for example, blue color, or the like) as a predetermined image, on the screen.

Figure 3B:
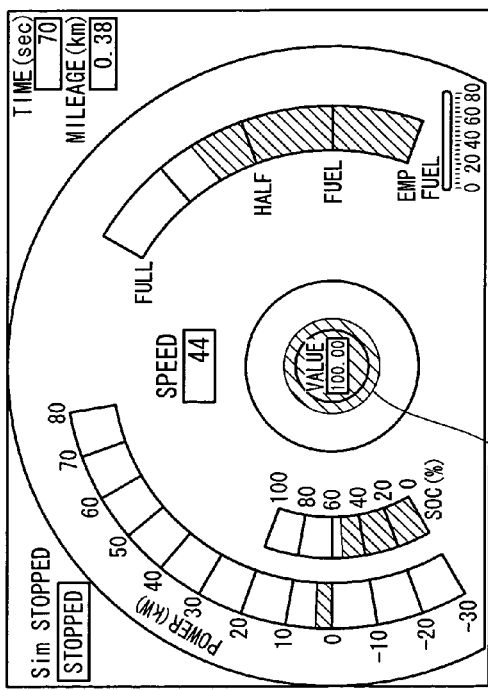

In addition, as shown in FIG. 3B, and from time t3 to t4 of FIG. 4, while the fuel cell vehicle 10 is in an accelerating state, the instant fuel efficiency calculated by the instant fuel efficiency calculating section 57 becomes smaller than the ideal fuel efficiency calculated by the cruise fuel efficiency calculating section 58, and the instant fuel efficiency fraction becomes less than 100%. At this time, the display device 23 displays, for example, a sphere-shaped image Pb having, for example, a radius which increases to the predetermined maximum radius in accordance with the decreasing instant fuel efficiency fraction, and the predetermined color (for example, red color, or the like) as a predetermined image, on the screen.

Figure 3C:
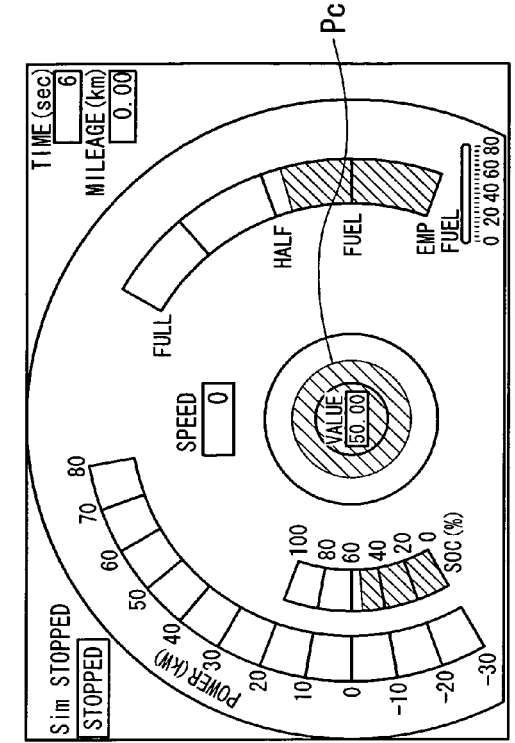

In addition, as shown in FIG. 3C, and from time t2 to t3 of FIG. 4, while the fuel cell vehicle 10 is in a traveling-stopped state, in accordance with the decreasing interval fuel efficiency fraction with respect to the interval fuel efficiency fraction at the predetermined first time-interval in which before the traveling state of the fuel cell vehicle 10 reaches the traveling-stopped state, the display device 23 displays a sphere-shaped image Pc having a radius which increases from the predetermined minimum radius to the predetermined maximum radius, and the predetermined color (for example, yellow, or the like) on the screen.

The fuel efficiency display device 1 of the fuel cell vehicle 10 according to the present embodiment has the above-mentioned construction, and the operations of the fuel efficiency display device 1, that is, a fuel efficiency displaying method will be explained below with reference to drawings.

Firstly, in a step S01 shown in for example FIG. 5, a vehicle state amount such as the motor rotation number NM, the vehicle speed V, and the motor torque TM, is obtained.

Next, in step S02, the instant mileage and the instant traveling-energy at the predetermined second time-interval which is a relatively short time interval and an instant time interval with respect to the present time, are calculated based on the obtained vehicle state amount.

Then, in step S03, the interval mileage and the interval traveling energy are calculated by integrating each instant mileage and the instant traveling-energy through the predetermined first time-interval which is a relatively long time interval ascending from the present time to the past.

Then, in step S04, a status amount of the fuel cell 13 such as output current IF of the fuel cell 13, purging amount of unreacted hydrogen discharged to the outside, and the like, is obtained.

Then, in step S05, the interval hydrogen-consumption amount consumed for power generation in the fuel cell 13 is calculated through the predetermined first time-interval based on obtained status amount of the fuel cell 13.

Then, in step S06, the interval vehicle efficiency is calculated by dividing the interval traveling energy by the interval hydrogen-consumption amount.

Then, in step S07, the instant hydrogen-consumption amount is calculated by dividing the instant traveling-energy by the interval vehicle efficiency.

Then, in step S08, the instant fuel efficiency is calculated by dividing the instant mileage by the instant hydrogen-consumption amount.

Then, in step S09, the ideal fuel efficiency which is ideal fuel efficiency at the predetermined second time-interval is calculated based on obtained vehicle status amount.

Then, in step S10, the instant fuel efficiency fraction is calculated by dividing the instant fuel efficiency by the ideal fuel efficiency.

Then, in step S11, the interval fuel efficiency is calculated by dividing the interval mileage by the interval hydrogen-consumption amount.

Then, in step S12, the standard fuel efficiency is obtained which is the standard fuel efficiency stored in advance for range through which the fuel cell vehicle 10 has traveled, in the predetermined first time-interval.

Then, in step S13, the interval fuel efficiency fraction is calculated by dividing the interval fuel efficiency by the standard fuel efficiency.

Then, in step S14, it is determined whether the fuel cell vehicle 10 is in the traveling-stopped state or not based on the obtained vehicle status amount.

If the determination result is "NO", then the process proceeds to step S15. In the step S15, the instant fuel efficiency fraction is set for the fuel efficiency fraction, and the process proceeds to step S17.

If the determination result is "YES", then the process proceeds to step S16. In the step S16, the interval fuel efficiency fraction is set for the fuel efficiency fraction, and the process proceeds to step S17.

Then in step S17, the predetermined image having, for example, the size, the color, and the like which changes depending on the size of the fuel efficiency fraction, is displayed on the screen, and a series of processes is terminated.

As has been explained in the above, according to the fuel efficiency display device of the fuel cell vehicle 10, and the fuel efficiency displaying method for the fuel cell vehicle 10, of the present embodiment, by calculating the instant fuel efficiency based on the instant traveling-energy and the interval vehicle efficiency as for information of the fuel efficiency to be displayed on the display device 23 while in the traveling state of the fuel cell vehicle 10, it is possible to display appropriate fuel efficiency regardless of, for example, the existence of power assisting by the power storage device 11 to the fuel cell 13, or the existence of power charging from the fuel cell 13 and the motor 16 to the power storage device 11.

That is, when the fuel efficiency is calculated in the second time-interval that is a relatively short time, based on only by the mileage of the fuel cell vehicle 10, and the hydrogen consumption amount of the fuel cell 13 that is directly calculated from the output current and the purging amount and the like of the fuel cell 13 (that is, without using the interval vehicle efficiency), the reliability of the calculation result for the fuel efficiency will be lowered because, in addition to the power-assisting (assist) to the power of the fuel cell 13 by discharged power from the power storage device 11, operations of the fuel cell system such as, for example, receiving and supplying of the electrical energy between the power storage device 11 and the motor 16, and charging of the power storage device 11 by the generated power by the fuel cell 13, are not systematically considered. For example, while in a vehicle accelerating state, if the increase of the hydrogen consumption amount in the fuel cell 13 is suppressed in accordance with increasing assisting amount by the power storage device 11, there was a problem in that calculation result of the fuel efficiency becomes excessively preferable, in spite of the increasing total energy consumption of the vehicle.

In order to solve this kind of problem, in the present embodiment, firstly, by calculating the interval vehicle efficiency based on the hydrogen consumption amount of the fuel cell 13 at the predetermined first time-interval that is a relatively long time interval (i.e., the interval hydrogen-consumption amount), and the traveling energy that contributed to the traveling of the fuel cell vehicle 10, the energy efficiency of the vehicle is obtained which systematically considers operations of the fuel cell system such as electrical energy transmission between the power storage device 11 and the motor 16, and charging of the power storage device 11 by the generated power from the fuel cell 13, in addition to the assist by the power storage device 11.

Then, by dividing the instant traveling-energy by the interval vehicle efficiency, even at the second time-interval that is a relatively short time interval, the hydrogen consumption amount (i.e., the instant hydrogen-consumption amount) is calculated that systematically considers operations of the fuel cell system such as the electrical energy transmission between the power storage device 11 and the motor 16, and charging of the power storage device 11 by the generated power from the fuel cell 13, in addition to the assist by the power storage device 11.

Furthermore, according to the present embodiment, by changing time span of the first time-interval to the predetermined value, it is possible to change operations of the fuel cell system, the traveling history of the fuel cell vehicle 10, and the like, that influence the instant hydrogen-consumption amount. With this, even in a state in which, for example, the motor 16 maintains the predetermined output, it is possible to easily set such that, the instant fuel efficiency decreases when the fuel cell vehicle 10 travels while repeating accelerations and decelerations alternatively and frequently, and also such that the instant fuel efficiency increases when the fuel cell vehicle 10 travels while suppressing the accelerations and decelerations.

In addition, in the present embodiment, when the fuel cell vehicle 10 is in a traveling state, by visually displaying the fraction of the instant fuel efficiency with respect to the ideal fuel efficiency, that is, by visually displaying the deviation amount of the fuel efficiency in accordance with driving operations by the driver with respect to the ideal fuel efficiency, it is possible to suggest to the driver to perform follow-up operation that corresponds to the ideal fuel efficiency, and thereby improving the fuel efficiency of the fuel cell vehicle 10.

In addition, when the fuel cell vehicle 10 is in a traveling-stopped state, by visually displaying the fraction of the interval fuel efficiency with respect to the standard fuel efficiency, that is, by visually displaying the deviation amount of the fuel efficiency in accordance with driving operations by the driver in a traveling state before reaching to the traveling-stopped state, with respect to the standard fuel efficiency, it is possible to make the driver properly recognize the quality of the driving operation history of the driver.

Furthermore, it is possible to make the driver easily and visually recognize the deviation amount even when the driver does not look into the screen because the screen of the display device 23 is arranged within a view field of the driver on driving, and because the predetermined image is displayed of which color, size, and the like change depending on the deviation amount of the fuel efficiency in accordance with driving operations by the driver, with respect to the ideal fuel efficiency or the standard fuel efficiency.

Moreover, in the above-mentioned embodiment, the measured signals from the sensors 31, . . . , 40 are input to the controller 22; however, the present invention is not limited to this construction. That is, instead of the above-mentioned construction, the measurement values may be estimated by the controller 22.

In addition, in the above-mentioned embodiment, the interval hydrogen consumption amount calculating section 54 calculates the interval hydrogen-consumption amount based on output current IF of the fuel cell 13 and the amount of the unreacted hydrogen that is to be discharged to the outside; however, the present invention is not limited to this construction. For example, the interval hydrogen-consumption amount may be calculated based on internal pressure, temperature, and the like of the hydrogen tank 19*a*.

Moreover, in the above-mentioned embodiment, the predetermined image that corresponds to the fraction of the instant fuel efficiency with respect to the ideal fuel efficiency, or to the fraction of the interval fuel efficiency with respect to the standard fuel efficiency is displayed on the screen of the display device 23; however, the present invention is not limited to this construction. For example, the predetermined image may be displayed on the screen of the display device 23, in order to indicate the deviation between the ideal fuel efficiency and the instant fuel efficiency as an example showing the status amount according to the difference between the ideal fuel efficiency and the instant fuel efficiency, or to indicate the deviation between the standard fuel efficiency and the interval fuel efficiency as an example showing the status amount according to the difference between the standard fuel efficiency and the interval fuel efficiency.

While preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATIONS FOR THE REFERENCE SYMBOLS

1 . . . fuel efficiency display device; 10 . . . fuel cell vehicle; 11 . . . power storage device; 13 . . . fuel cell; 15 . . . PDU (a motor-controlling device); 16 . . . motor; 17 . . . output power controller (an output power-controlling device); 18 . . . air-supply device (a reaction gas supply device); 19*a* . . . hydrogen tank (a reaction gas supply device); 19*b* . . . hydrogen-supply valve (a reaction gas supply device); 23 . . . display device; 52 . . . instant traveling energy calculating section (a second interval traveling energy obtaining device); 55 . . . interval vehicle efficiency calculating section (a first interval vehicle efficiency obtaining device); 57 . . . instant fuel efficiency calculating section (second interval fuel efficiency obtaining device); 58 . . . cruise fuel efficiency calculating section (ideal fuel efficiency obtaining device); 59 . . . instant fuel efficiency fraction calculating section (a second interval fuel efficiency difference calculating device); 61 . . . interval fuel efficiency calculating section (a first interval fuel efficiency obtaining device); 62 . . . standard fuel efficiency storage section (a standard fuel efficiency obtaining device); 63 . . . interval fuel efficiency fraction calculating section (a first interval fuel efficiency difference calculating device); S02 . . . second interval traveling energy obtaining step; S06 . . . first interval vehicle efficiency obtaining step; S08 . . . fuel efficiency obtaining step, second interval fuel efficiency obtaining step; S09 . . . ideal fuel efficiency obtaining step; S10 . . . second interval fuel efficiency difference calculating step; S11 . . . first interval fuel efficiency obtaining step; S12 . . . standard fuel efficiency obtaining step; S13 . . . first interval fuel efficiency difference calculating step; step S17 . . . displaying step.

What is claimed is:

1. A fuel efficiency displaying method for a fuel cell vehicle including a motor that is a driving source of the fuel cell vehicle, a motor controller that controls an operation status of the motor, a fuel cell system that is a power source for the motor, and a controller that calculates and displays fuel efficiency, said fuel cell system including a fuel cell which receives reaction gasses and performs electrochemical reactions to generate an electrical power, and a power storage device which is charged with the generated electrical power from the fuel cell and a regeneration power from the motor, and discharges an assisting power to assist the electrical power of the fuel cell, said fuel efficiency displaying method for a fuel cell vehicle comprising:

a first interval vehicle efficiency obtaining step for obtaining a first interval vehicle efficiency that is an average energy efficiency at a predetermined first time-interval that ascends from the present time to the past and is a relatively long time interval, based on (i) a reaction gas amount that was consumed for power generation in the fuel cell in the first time-interval, and (ii) a traveling energy generated in the first time-interval, wherein an increase of the reaction gas amount consumed in the fuel cell is suppressed in accordance with increasing an amount of the assisting power from the power storage device;

a second interval traveling energy obtaining step for obtaining a second interval traveling energy that is a traveling energy generated in a predetermined second time-interval which is shorter than the first time-interval and is also an instant time-interval with respect to the present time;

a second interval fuel efficiency obtaining step for obtaining a second interval fuel efficiency that is an average fuel efficiency of the fuel cell vehicle in the second time-interval, based on at least the first interval vehicle efficiency and the second interval traveling energy;

an ideal fuel efficiency obtaining step for obtaining an ideal fuel efficiency that is a predetermined ideal fuel efficiency which corresponds to a state of the fuel cell vehicle in the second time-interval;

a second interval fuel efficiency difference calculating step for calculating a second interval fuel efficiency difference that is a fraction of the second interval fuel efficiency corresponding to a driving operation of a driver with respect to the ideal fuel efficiency in the second time-interval, based on the second interval fuel efficiency and the ideal fuel efficiency; and a displaying step for displaying the second interval fuel efficiency difference, wherein in said displaying step, an image having a circular-shape and size corresponding to said second interval fuel efficiency difference is displayed, and a diameter of the circular-shape is changed in response to said second interval fuel efficiency difference.

2. The fuel efficiency display method for a fuel cell vehicle according to claim 1, further comprising:

a first interval fuel efficiency obtaining step for obtaining a first interval fuel efficiency that is a fuel efficiency in the first time-interval, based on at least the reaction gas amount and an interval mileage that is a mileage at the first time-interval;

a standard fuel efficiency obtaining step for storing a standard fuel efficiency that is a standard fuel efficiency based on a plurality of actual traveling statuses of the fuel cell vehicle so as to correspond to each of predetermined interval regions through which the fuel cell vehicle travels in the first time-interval;

a first interval fuel efficiency difference calculating step for calculating a first interval fuel efficiency difference that is a fraction of (i) the first interval fuel efficiency and (ii) the first interval fuel efficiency which corresponds to a driving operation of a driver with respect to the ideal fuel efficiency, and which corresponds to an interval through which the fuel cell vehicle travels in the first time-interval; and a fuel efficiency fraction selecting step for determining whether the fuel cell vehicle is in a traveling state or in a traveling-stopped state, which selects the second interval fuel efficiency difference if it is determined that the fuel cell vehicle is in the traveling state, and which selects the first interval fuel efficiency difference if it is determined that the fuel cell vehicle is in the traveling-stopped state, wherein in the displaying step, one selected from the first interval fuel efficiency difference and the second interval fuel efficiency difference is displayed.

3. The fuel efficiency display method for a fuel cell vehicle according to claim 2, wherein in said displaying step, an image having a size corresponding to said first interval fuel efficiency difference is displayed.

4. The fuel efficiency display method for a fuel cell vehicle according to claim 3, wherein in said displaying step, the image having a circular-shape is displayed, and a diameter of the circular-shape is changed in response to said first interval fuel efficiency difference.

* * * * *